Dec. 31, 1957     T. A. McGOVERN     2,817,882
INSECT REPELLANT ATTACHMENT FOR GASOLINE LANTERNS
Filed May 7, 1956     2 Sheets-Sheet 1
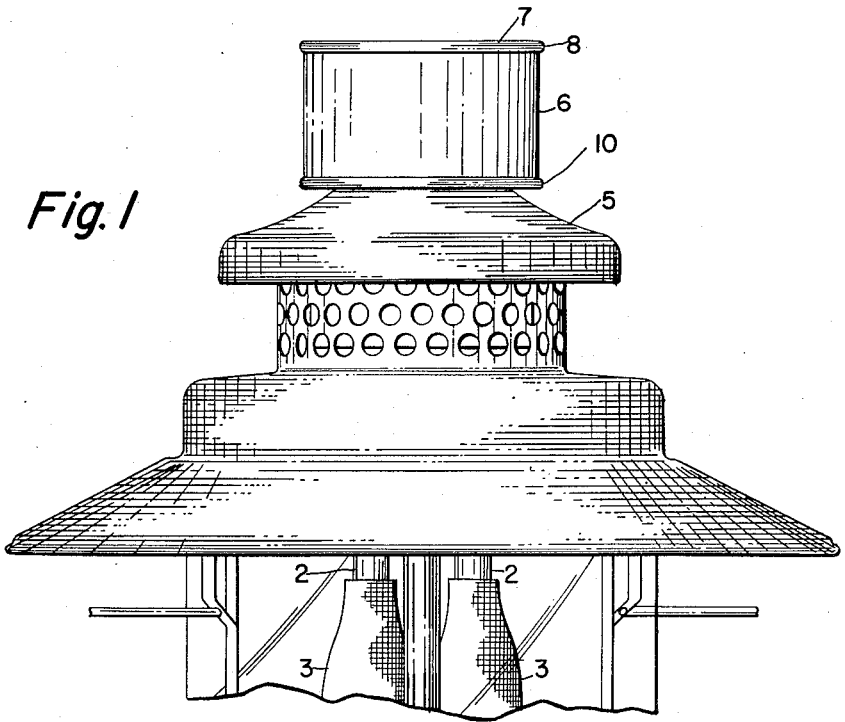
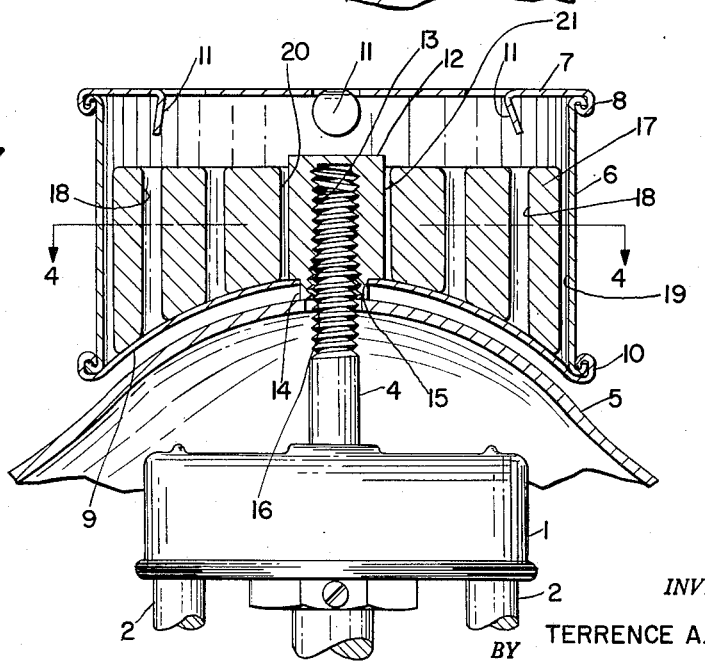
INVENTOR.
TERRENCE A. McGOVERN
BY
ATTORNEYS Dec. 31, 1957 T. A. McGOVERN 2,817,882
INSECT REPELLANT ATTACHMENT FOR GASOLINE LANTERNS
Filed May 7, 1956 2 Sheets-Sheet 2
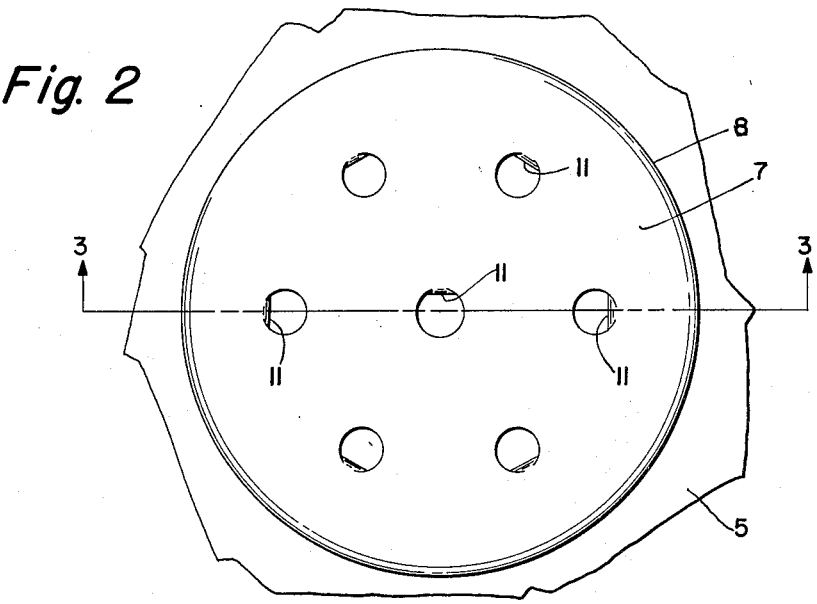
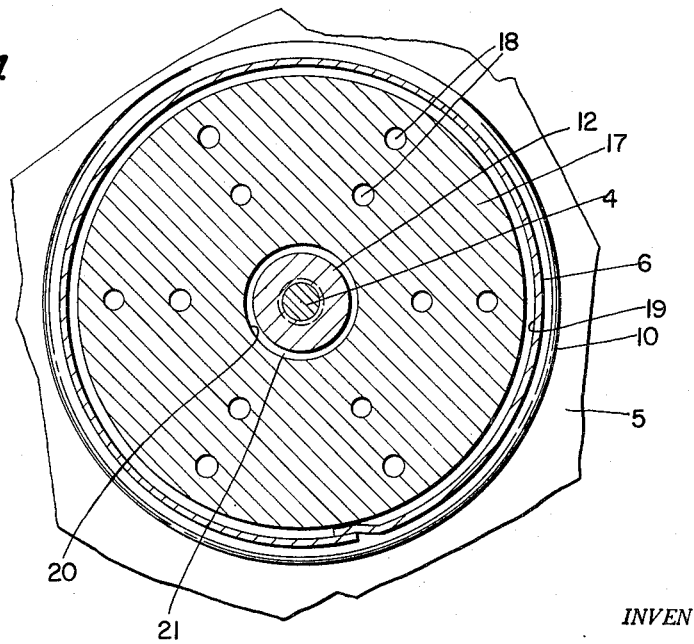
*INVENTOR.*
TERRENCE A. McGOVERN
BY
ATTORNEYS

United States Patent Office 2,817,882
Patented Dec. 31, 1957

2,817,882

INSECT REPELLANT ATTACHMENT FOR GASOLINE LANTERNS

Terrence A. McGovern, Cleveland, Ohio

Application May 7, 1956, Serial No. 582,995

5 Claims. (Cl. 21—108)

This invention relates generally to insect repellant units or canisters, but has reference more particularly to a unit or canister which is especially adapted for use as an attachment for gasoline lanterns and the like.

In Fig. 5 of the McCutchen Patent No. 1,718,473, there is disclosed a lamp of the type which has come to be generally known as a Coleman lamp. This lamp is commonly used by fishermen and other sportsmen for providing illumination, being characterized by a Welsbach type mantle which is ignited or brought to incandescence by the combustion of a liquid hydrocarbon fuel, such as gasoline.

Such lamps are frequently used in areas or localities where insects abound, and it is necessary, in such cases to provide some means for repelling or destroying the insects, so as to provide conditions which are more conducive to fishing and the like.

The Coleman lamp, I have discovered, provides an excellent medium not only for the use and attachment thereto of insect repellant means, but provides an excellent source, as well, of heat for vaporizing an insect repellant.

The present invention, accordingly, has as its primary object the provisions of an insect repellant attachment which is especially adapted for use in combination with a lamp or lantern of the character described.

Another object of the invention is to provide an attachment of the character described, which is self-contained and of the disposable type, permitting it to be disposed of when used up, and replaced by another unit, identical with the first.

A further object of the invention is to provide an attachment of the character described, which is so designed as to enable it to quickly and efficiently receive heat from the lamp which would otherwise be wasted.

A still further object of the invention is to provide an insect repellant unit or canister which is of simple and inexpensive construction, and which can, if desired, be used independently of a lamp or lantern.

Other objects and advantages of my invention will be apparent during the course of the following description.

In the accompanying drawings forming a part of this specification and in which like numerals are employed to designate like parts throughout the same, Fig. 1 is a fragmentary elevational view, showing the insect repellant attachment, as applied to a lamp of the character described;

Fig. 2 is a fragmentary top plan view of the parts shown in Fig. 1, but on an enlarged scale;

Fig. 3 is a fragmentary cross-sectional view, taken on the line 3—3 of Fig. 2, and Fig. 4 is a fragmentary cross-sectional view, taken on the line 4—4 of Fig. 3.

Referring more particularly to the drawings, there is disclosed the upper portion of a Coleman lamp, similar to that shown in Fig. 5 of the aforesaid McCutchen patent, and having a mixing chamber or manifold 1, which receives vaporized gasoline and conducts it through mantle supports 2 to mantles 3 of the Welsbach type.

Secured to the manifold 1 is a post or stem 4, which is normally used for the securement to the lamp of a hood 5, the hood being usually retained in place by means of a nut (not shown), which is threaded to the upper end of the post 4 and bears upon the upper surface of the hood. For the purposes of the present invention, this nut is removed, and there is threadedly secured to the upper portion of the post 4, the insect repellant attachment which is the subject of this invention.

The insect repellant attachment comprises an annular can body 6 having a top 7 permanently secured thereto, as by interlocked flanges 8, and a bottom 9 permanently secured thereto, as by interlocked flanges 10.

The top 7 is provided with spaced tabs 11, similar to those provided on an ordinary can of cleansing powder, these tabs being normally closed, but adapted to be punched inwardly in the manner shown in Figs. 2 and 3, when the attachment is in use.

The bottom 9 of the attachment is of spherical contour, conforming generally to the contour of the upper portion of the hood 5 of the lamp, and has brazed or otherwise permanently secure to the upper central surface thereof a nut 12 provided with threads 13 adapted to be threaded onto the threads of the post or stem 4. The nut 12 is provided with a portion 14 of reduced diameter, which extends through an opening 15 in the bottom 9, and the lower end of which bears against the surface of the hood 5, as best shown in Fig. 3, so as to space the bottom 9 slightly from the hood 5.

In order to facilitate quick and easy attachment of the insect repellant attachment to the post 4, the threads 16 of the nut 12 near the lower end of the nut are of slightly larger diameter than the threads of the post 4, as shown in Fig. 3.

Disposed within the attachment is a cake 17 of an insect repellant material or compound which is easily vaporizable by heat. This cake 17 rests upon and conforms in contour to the bottom 9, and is provided with spaced openings 18 which increase the area from which the compound can be vaporized. To further increase this area, the peripheral diameter of the cake 17 is made slightly smaller than the internal diameter of the body 6, so as to provide an annular space 19, and the cake is provided with a central opening 20 which is slightly larger than the external diameter of the nut 12, so as to provide an annular space 21.

With the insect repellant attachment in place, as shown in Figs. 1 and 3, the heat of the lamp is transmitted from the interior of the lamp to the post or stem 4 and thence to the nut 12 and parts 9, 6 and 7 of the can, providing sufficient heat to vaporize the cake 17. The vapor from this cake passes through the openings provided by punching the tabs 11 inwardly, and is thus effective to repel or destroy insects.

Some additional heat is provided by the hood 5, but, in practice, the heat provided by the post 4 is sufficient for all practical purposes. Should the heat from the hood 5 be excessive, a barrier or sheet of asbestos or other heat insulating material may be interposed between the hood 5 and bottom 9.

After the contents of the attachment have become depleted, the entire attachment may be unscrewed from the post 4, the attachment discarded, and a new attachment secured to the post 4.

It is thus seen that I have provided an insect repellant attachment which is especially adapted for use in combination with a lamp or lantern of the character described, which is of the self-contained and disposable type, permitting it to be discarded when used up, and replaced by another identical unit, which is so designed as to enable it to quickly and efficiently receive heat from the lamp which would otherwise be wasted, and which is of simple and inexpensive construction.

Although the attachment has been described as especially adapted for use with a lamp or lantern of the character described, it will be understood that it may also be used independently of such a lamp, in which case any source of heat may be utilized to vaporize the contents of the canister.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In combination with a lamp or lantern, having a hood and a threaded post projecting above said hood, an insect repellant attachment secured to said post and disposed above said hood, said attachment having an annular side wall and a top having openings therein and being provided with a nut adapted to be threadedly secured to said post, said attachment being also provided with a bottom conforming generally to the shape of said hood, and said nut being provided with an extended portion which projects through said bottom and spaces said bottom from said hood, and an insect repelling material in said attachment.

2. In combination with a lamp or lantern having a hood and a threaded post projecting above said hood, an insect repellant attachment comprising an annular body, a top permanently secured to said body and having tabs adapted to be pushed inwardly to provide openings in said top, a bottom of arcuate cross-section permanently secured to said body, said bottom having a central opening, and an internally-threaded nut secured to said bottom and provided with a portion extending through said central opening, said nut being secured to said post, and a cake of insect repellant compound disposed within said body.

3. The combination, as defined in claim 2, in which said cake rests on said bottom, has a bottom contour conforming to said bottom, and has a central opening through which said nut extends.

4. In combination with a lamp or lantern having a hood and a threaded post projecting above said hood, an insect repellant attachment comprising an annular body, a top permanently secured to said body and having openings therein, a bottom of arcuate cross-section permanently secured to said body, an insect repellant compound disposed within said body, said bottom having a central opening through which said post extends, and a nut secured to said post and securing said attachment to said post.

5. The combination, as defined in claim 4, in which said insect repelling material comprises a cake which rests on said bottom and has a central opening through which said nut extends.

References Cited in the file of this patent

UNITED STATES PATENTS

| | | |
|---|---|---|
| Re. 16,841 | Bradner | Jan. 3, 1928 |
| 1,208,467 | Bowerman | Dec. 12, 1916 |
| 1,718,473 | McCutchen | June 25, 1929 |
| 2,372,371 | Eisner | Mar. 27, 1945 |
| 2,435,756 | Schlesinger | Feb. 10, 1948 |